United States Patent
Herrera Mejia et al.

(10) Patent No.: US 9,335,808 B2
(45) Date of Patent: May 10, 2016

(54) INDICATING CRITICAL BATTERY STATUS IN MOBILE DEVICES

(71) Applicant: Intel Corporation, Santa Clara, CA (US)

(72) Inventors: Ivan Herrera Mejia, Folsom, CA (US); Kenneth D. Shoemaker, Los Altos Hills, CA (US); Ryan D. Wells, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 13/791,218

(22) Filed: Mar. 8, 2013

(65) Prior Publication Data

US 2014/0258698 A1    Sep. 11, 2014

(51) Int. Cl.
| | | |
|---|---|---|
| G06F 1/14 | (2006.01) | |
| G06F 1/28 | (2006.01) | |
| G06F 9/44 | (2006.01) | |
| G06F 1/30 | (2006.01) | |
| G06F 11/00 | (2006.01) | |

(52) U.S. Cl.
CPC .. *G06F 1/28* (2013.01); *G06F 1/30* (2013.01); *G06F 9/4401* (2013.01); *G06F 11/00* (2013.01)

(58) Field of Classification Search
CPC .................................................. G06F 9/4401
USPC ............. 702/63; 320/132; 455/566; 345/211; 713/323; 705/14.53
See application file for complete search history.

(56) References Cited

U.S. PATENT DOCUMENTS

| | | | |
|---|---|---|---|
| 6,031,999 A * | 2/2000 | Ogawa ......................... 396/303 |
| 6,115,822 A | 9/2000 | Kim et al. | |
| 2004/0215408 A1* | 10/2004 | Lamer et al. .................... 702/63 |
| 2006/0033744 A1 | 2/2006 | Perez | |
| 2008/0120513 A1 | 5/2008 | Kim | |
| 2010/0227651 A1* | 9/2010 | Kim .............................. 455/566 |
| 2011/0282740 A1* | 11/2011 | Ochi ..................... G06F 1/3228 705/14.53 |
| 2012/0084697 A1 | 4/2012 | Reeves | |
| 2013/0076715 A1* | 3/2013 | Selim ........................... 345/211 |

(Continued)

FOREIGN PATENT DOCUMENTS

| | | |
|---|---|---|
| EP | 2381359 | 10/2011 |
| EP | 2533064 | 12/2012 |

(Continued)

OTHER PUBLICATIONS

Combined Search and Exam for United Kingdom Patent Application No. 1402706.4 mailed Jul. 15, 2014, 8 pages.

(Continued)

*Primary Examiner* — Thomas Lee
*Assistant Examiner* — Aurel Prifti
(74) *Attorney, Agent, or Firm* — Trop, Pruner & Hu, P.C.

(57) ABSTRACT

An integrated circuit such as a SoC may indicate the critical battery status without powering-on a substantial portion including the host processing cores. The SoC may include a microcontroller, which may cause the critical battery status data to be stored in a static memory and the display unit may retrieve such data from the static memory to display a visual symbol on the screen. The other portions of the SoC such as the dynamic memory, system agent, media processors, and memory controller hubs may be powered-down while the critical battery status is displayed in the visual form on the screen.

11 Claims, 5 Drawing Sheets

(56) References Cited

U.S. PATENT DOCUMENTS

2013/0124895 A1* 5/2013 Saha et al. .................... 713/323
2013/0335029 A1* 12/2013 Cooper et al. ............... 320/132

FOREIGN PATENT DOCUMENTS

| | | |
|---|---|---|
| EP | 2725453 | 4/2014 |
| JP | 2001005547 | 1/2001 |
| JP | 2005184619 | 7/2005 |
| JP | 2007219688 | 8/2007 |
| JP | 2009134576 | 6/2009 |
| JP | 2010134698 | 6/2010 |
| WO | WO-2011001671 | 1/2011 |

OTHER PUBLICATIONS

Non-Final Office Action for Japanese Patent Application No. 2014-025178 mailed Jan. 27, 2015, 4 pages.
Final Office Action for Japanese Patent Application No. 2014-025178 mailed Jun. 9, 2015, 2 pages.

* cited by examiner

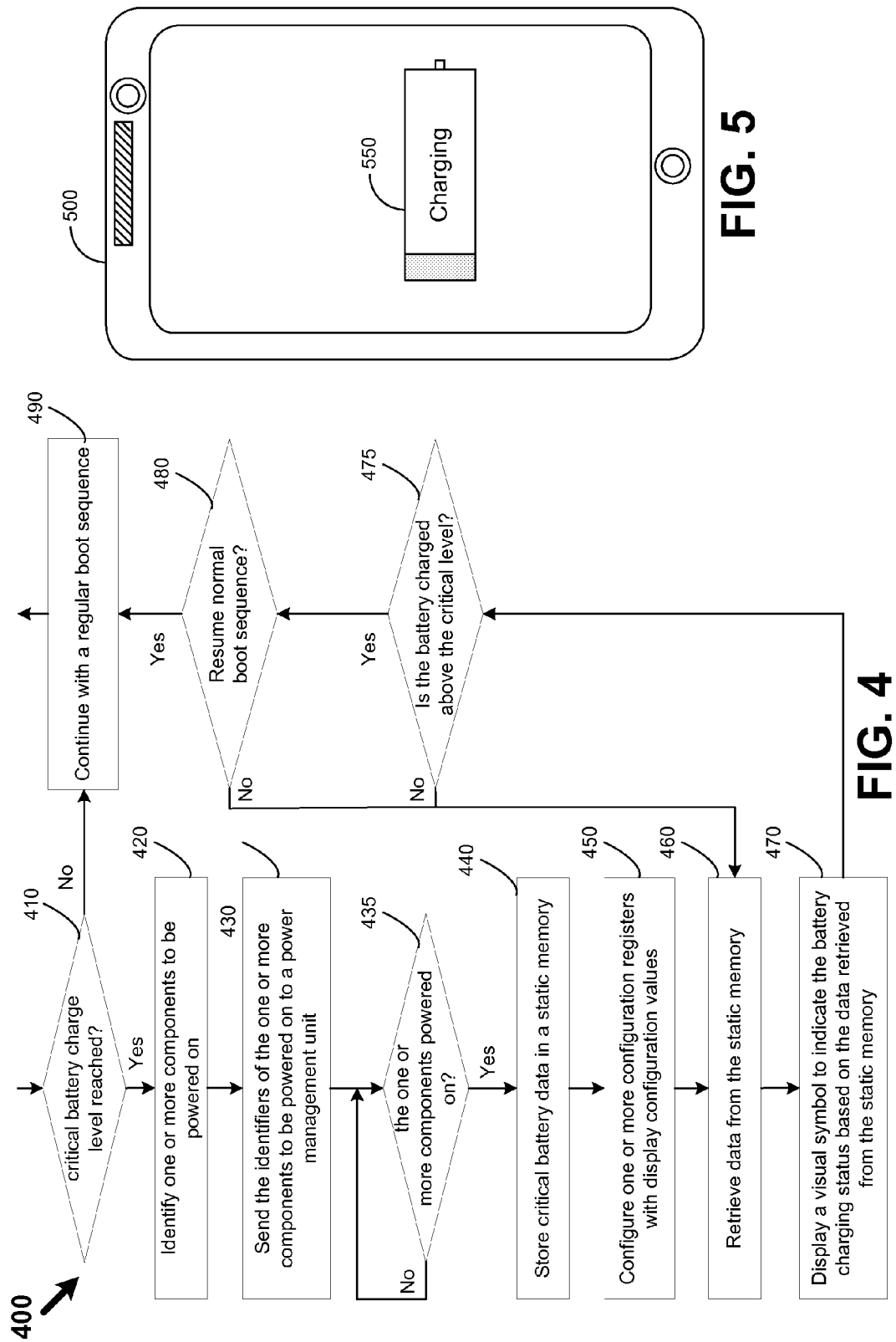

INDICATING CRITICAL BATTERY STATUS IN MOBILE DEVICES

FIELD OF THE INVENTION

This disclosure pertains to indicate battery status in mobile devices, as well as code to execute thereon, and in particular but not exclusively, to indicate critical battery status in mobile devices.

BACKGROUND

Displaying battery status in mobile devices is an important indication about the status of the mobile device to the users. However, the current mobile devices follow a normal boot sequence in which a host processor is powered-on first. The host processor may then come out of reset and the power-on other blocks such as system agent, dynamic memory (e.g., DRAM) before powering on the display devices. Then, the display device may provide a visual status (such as a symbol of a battery) on the user interface to indicate to a user that the mobile device is being charged. The normal boot sequence may be followed even if the battery is in a critical (none or minimum) charged state. The host processors are computationally powerful and are low powered as well, but, the battery may not be capable to support the current surges that may occur while the host processor, dynamic memory, system agent, and such other blocks are powered on.

However, if the battery is in critical charged state (i.e., no charge or very less charge) and if the normal boot sequence is followed, the battery will not be in a condition to support the current surges to power-on the host processor. As a result, the display may not be powered-on and without a visual indication of the battery status, the mobile device appears to be dead even if it is not so. In the absence of such an indication the user may jump to a conclusion that the mobile device is not working or malfunctioning.

BRIEF DESCRIPTION OF THE DRAWINGS

The embodiments of the invention described herein are illustrated by way of examples and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 is a flow-chart, which illustrates an operation of the blocks of the first portion to support a technique to indicate critical battery status in mobile devices in accordance with one embodiment.

FIG. 5 is an example mobile device, which may provide a visual indication of the critical battery status in accordance with one embodiment.

DETAILED DESCRIPTION

Figure 1:
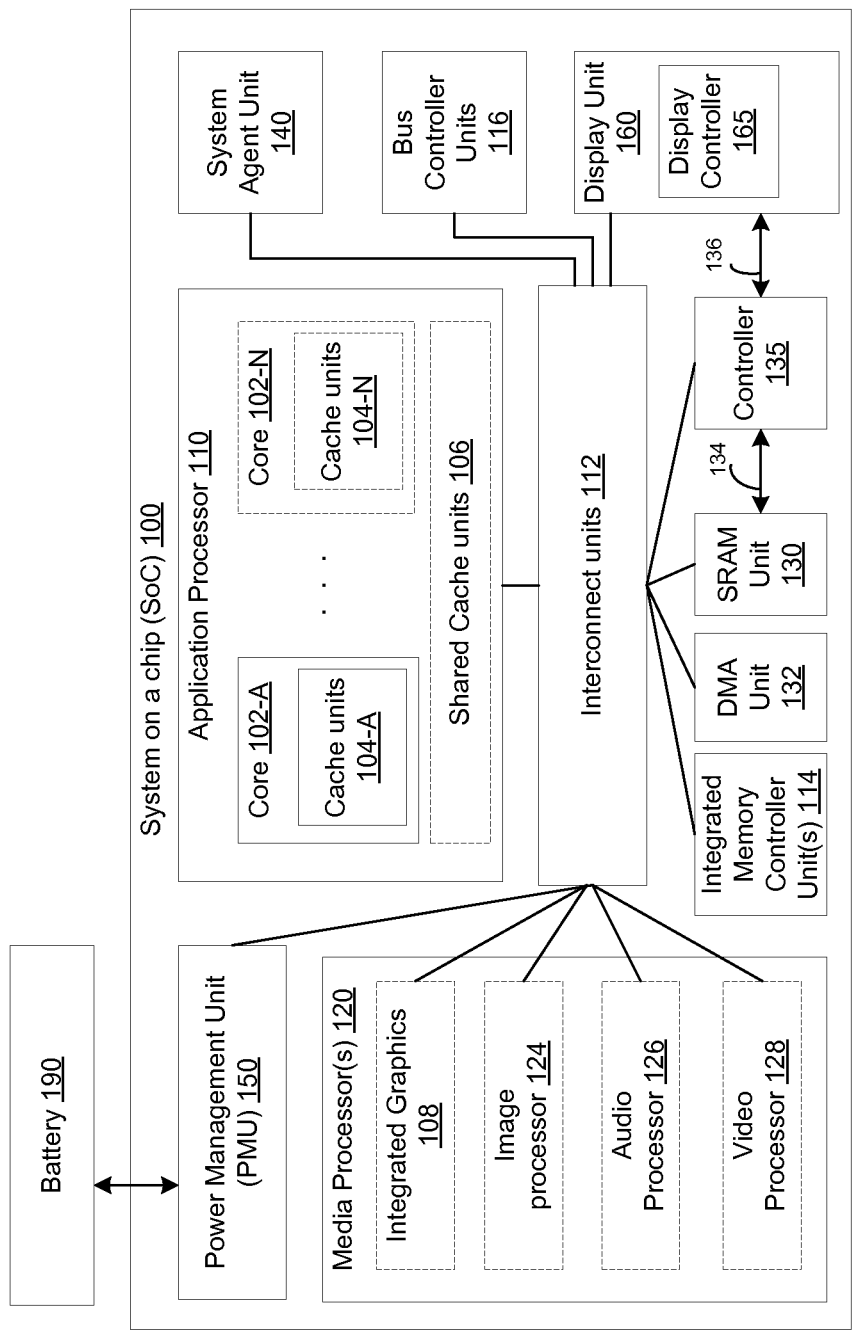
FIG. 1 illustrates a system-on-chip (SoC) 100, which may support a technique to indicate critical battery status in mobile devices in accordance with one embodiment.

The following description describes embodiments, which may indicate critical battery status in mobile devices. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

A SoC may include a host processor, system agent, dynamic memory, static memory, power management unit, media processors, bus controllers, integrated memory controller, and such other blocks. In one embodiment, the SoC may include a microcontroller to cause the critical battery status to be indicated without powering-on the host processor. In one embodiment, the microcontroller may determine if the battery status is in a critical charged state and may initiate a special boot sequence. In one embodiment, the microcontroller may send a power-up signal to the power management unit to power-on substantially less number of blocks as compared to the number of blocks powered-on in a normal boot sequence. Further, the substantially less number of blocks powered-on during the special boot sequence may operate with lesser magnitude of current surges as compared to the current surges required to operate the host processor and other blocks powered-on during the normal boot sequence.

In one embodiment, in response to receiving the power-up signal from the microcontroller, the power management unit may power-up, for example, a static memory (e.g., SRAM), a display controller, and the bus interfaces provided between the microcontroller and the static memory and the display controller. In one embodiment, the microcontroller may store critical battery status display data in the static memory. In one embodiment, the microcontroller may then store configuration values in a configuration register provided in the display controller. In one embodiment, the display controller may retrieve the critical battery status data from the static memory in response to the configuration values stored in the configuration registers. In one embodiment, the display controller may then render the critical battery status data on a display screen of the mobile device. In one embodiment, the critical battery status data may be displayed in a visual form to indicate the battery status to user of the mobile device. In one embodiment, the critical battery status data may be displayed as a battery symbol on the display screen of the mobile device. As a result of the visual indication provided on the screen, the user of the mobile device may view the battery status without inferring that the mobile device is dead or malfunctioning.

An embodiment of a system-on-chip (SoC) 100, which may support one or more techniques to indicate the critical battery status on the screen of a mobile device is illustrated in FIG. 1. In one embodiment, the SoC 100 may include a single core or a multi-core application processor 110, interconnect unit(s) 112, integrated memory controller unit(s) 114, bus controller unit(s) 116, media processors 120, SRAM units 130, DRAM units 132, controller 135, system agent 140, power management unit 150, and display unit 160.

The processor 110 or 120 may be a general-purpose processor, such as a Core™ i3, i5, i7, 2 Duo and Quad, Xeon™, Itanium™, XScale™, Atom™ or StrongARM™ processor, which are available from Intel Corporation, of Santa Clara, Calif. Alternatively, the processor may be from another company, such as ARM Holdings, Ltd, MIPS, Advanced Micro Devices etc. The processor may be a special-purpose processor, such as, for example, a network or communication processor, compression engine, graphics processor, co-processor, embedded processor, or the like. The processor may be implemented on one or more chips. The processor 100 may be a part of and/or may be implemented on one or more substrates using any of a number of process technologies, such as, for example, BiCMOS, CMOS, or NMOS.

The SoC 100 may be used in system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

In FIG. 1, an interconnect unit(s) 112 is coupled to: an application processor 110 which includes a set of one or more cores 102A-N and shared cache unit(s) 106; a system agent unit 140; a bus controller unit(s) 116; an integrated memory controller unit(s) 114; a set or one or more media processors 120, which may include integrated graphics logic 108, an image processor 124 for providing still and/or video camera functionality, an audio processor 126 for providing hardware audio acceleration, and a video processor 128 for providing video encode/decode acceleration; a static random access memory (SRAM) unit 130; a direct memory access (DMA) unit 132; and a display unit 160, which may include one or more display controller(s) 165 for controlling one or more external displays, and a controller 135. In one embodiment, the controller 135 may be a mini or a micro controller and it may be designed to consume substantially low power. In one embodiment, even the battery in its critical (or minimal) charged state may support the power consumption of the controller 135.

The memory hierarchy includes one or more levels of cache within the cores, a set or one or more shared cache units 106, and external memory (not shown) coupled to the set of integrated memory controller units 114. The set of shared cache units 106 may include one or more mid-level caches, such as level 2 (L2), level 3 (L3), level 4 (L4), or other levels of cache, a last level cache (LLC), and/or combinations thereof. While in one embodiment a ring based interconnect units 112 interconnects the integrated graphics logic 108, the set of shared cache units 106, and the system agent unit 140, alternative embodiments may use any number of well-known techniques for interconnecting such units. In some embodiments, one or more of the cores 102A-N are capable of multi-threading.

The cores 102A-N may be homogenous or heterogeneous in terms of architecture and/or instruction set. For example, some of the cores 102A-N may be in order while others are out-of-order. As another example, two or more of the cores 102A-N may be capable of execution of the same instruction set, while others may be capable of executing only a subset of that instruction set or a different instruction set.

In one embodiment, the system agent 140 may include those components for coordinating and operating cores 102A-N. In one embodiment, the system agent unit 140 may include, for example, a power control unit (PCU) 150 and a display unit 160. The PCU 150 may include logic and components needed for regulating the power state of the cores 102A-N and the integrated graphics logic 108. The display unit 160 is for driving one or more externally connected displays. In other embodiments, the PCU 150 and display unit 160 may be provided outside the system agent 140 as depicted in FIG. 1. In one embodiment, the PCU 150 may be coupled to a battery 190 and the PCU 150 may keep checking the charge on the battery 190. In one embodiment, the PCU 150 may generate a battery indicator to indicate that the charge on the battery 190 has reached or decreased below a critical battery charge level. In one embodiment, the PCU 150 may power-down almost all the portions of the SoC 100. However, in one embodiment, the PCU 150 may not power-down the controller 135. In one embodiment, the PCU 150 may power-on a small portion (SRAM unit 130, the display unit 160, and the interfaces 134 and 136, for example) of the SoC 100 in response to receiving a request from the controller 135. In one embodiment, the PCU 150 may either configure the display controller 165 or may delegate that task to the controller 135.

In one embodiment, the controller 135 may cause the critical battery status to be indicated without powering-on most portions of the SoC 100. In one embodiment, the controller 135 may cause the critical battery status to be indicated without powering-on the application processor 110, media processor(s) 120, the system agent 140, DRAM unit 132, and such other blocks. In one embodiment, the controller 135 may determine if the battery status is in a critical charged state and may initiate a special boot sequence. In one embodiment, the controller 135 may send a power-up signal to the power management unit 150 to power-on substantially less number of blocks as compared to the number of blocks powered-on in a normal boot sequence. In one embodiment, the SRAM unit 130, the display unit 160, and the interfaces such as the interfaces 134 and 136. Further, the substantially less number of blocks powered-on during the special boot sequence may operate with lesser magnitude of current surges as compared to the current surges required to operate the application processor 110, media processor 120, and other blocks powered-on during the normal boot sequence.

In one embodiment, the controller 135 may send a request (to the power management unit 150) to power-up the SRAM unit 130, the display unit 160, and the bus interfaces 134 and 136 provided between the controller 135, the SRAM unit 130, and the display unit 160. In one embodiment, the controller 135 may store critical battery status display data in the SRAM unit 130. In one embodiment, the controller 135 may then store configuration values in one or more configuration registers provided in the display controller 165 if the PCU 150 delegates such a task to the controller 135. In one embodiment, the display controller 165 may retrieve the critical battery status data from the SRAM unit 130 in response to the configuration values stored in the configuration registers. In one embodiment, the display controller 15 may then render the critical battery status data on a display screen of the mobile device. In one embodiment, the critical battery status data may be displayed in a visual form to indicate the battery status to user of the mobile device. In one embodiment, the critical battery status data may be displayed as a battery symbol on the display screen of the mobile device.

Figure 2:
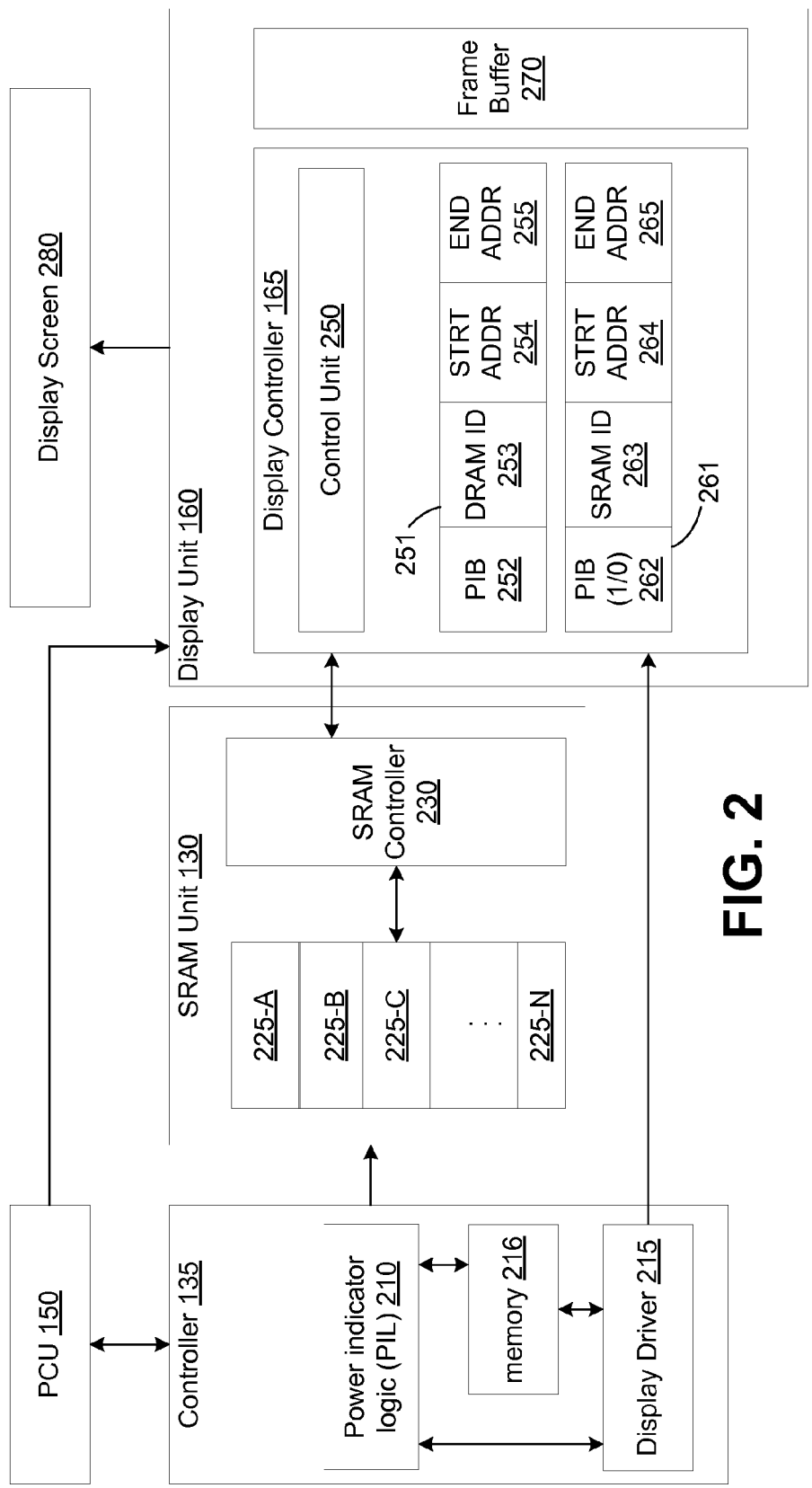
FIG. 2 illustrates a first portion of the SoC 100, which may support a technique to indicate critical battery status in mobile devices while the remaining (or second) portions of the SoC 100 are powered-off in accordance with one embodiment.

An embodiment of a block diagram of the controller 135, SRAM Unit 130, and the display unit 160, which may operate together to indicate the critical battery status even while the charge on the battery is at minimal levels is depicted in FIG. 2. In one embodiment, the controller 135 may include a power indicator logic 210 and a display driver 215. However, the controller 135 may include other units as well but, all such other units are not depicted here for brevity. In one embodiment, the power indicator logic 210 may monitor the status of the battery and may cause indications to be provided to the user. If the charge on the battery reduces below a particular level (i.e., critical battery status level), the power control unit 150 may power-off a substantial number of units provided within the SoC 100. In one embodiment, the power control unit 150 may use techniques such as voltage and frequency throttling, dynamic voltage and frequency scaling (DVFS), instruction throttling, selective and independent power control to multiple cores, change in system sleep states and core sleep states and such other techniques to control power to various portions of the SoC 100.

In one embodiment, substantial portions of the SoC 100 may be either switched off or in hibernation or any other such deep power saving state in response to the charge on the battery reaching or reducing below the critical charge or power state. However, the controller 135 may still be powered-on (or may not be powered-down) even if the charge or power level on the battery reaches or reduces below the critical charge or power state. In one embodiment, the power indicator logic 210 may send a request to the PCU 150 to power on the SRAM unit 130 and the display unit 160 and the interfaces 134 and 136. In one embodiment, the power indicator logic 210 may receive a response from the PCU 150 after powering-on the SRAM unit 130, the display unit 160. In one embodiment, the power indicator logic 210 may transfer the battery status data from the memory 216 to the memory blocks 225-A to 225-N provided in the SRAM unit 130. In an alternative embodiment, the power indicator logic 210 may send a first signal to the display driver 215 to perform transfer of the battery status data. In yet another alternate embodiment, the power indicator logic 210 may send a second signal to the SRAM controller 230 to cause the battery status data in the memory 216 to be transferred to the memory blocks 225.

In one embodiment, in response to receiving an indication from the power indicator logic 210, the display driver 215 may cause the battery status data to be transferred from the memory 216 to the memory blocks 225-A to 225-N or a sub-set of the memory blocks 225. In one embodiment, the battery status may represent a visual data such as a battery symbol, for example, which when rendered may provide an easy means for the user to understand the status of the battery. In one embodiment, the display driver 215 may then configure the configuration registers in the display controller 165 of the display unit 160. In one embodiment, the display driver 215 may configure the configuration registers 251 and 261. In one embodiment, the display driver 135 may configure the first configuration register 251 with (0, dram_id, strt_addr, end_addr) in the fields PIB 252, DRAMID 253, STRT ADDR 254 and END ADDR 255, respectively. Also, the display driver 135 may configure the second configuration register 261 with (1, sram_id, strt_addr, end_addr) in the fields PIB 262, SRAM ID 263, STRT ADDR 264 and END ADDR 265, respectively. In one embodiment, if the PIB 262 is configured with a first value (1, for example) then the critical battery status data may be read based on the values stored in the SRAM ID 263, STRT ADDR 264, and END ADDR 265 fields. In one embodiment, the configuration values stored in the fields 263, 264, and 265 may be valid only if the PIB 262 is configured with a first value (1, for example) and the values in the fields 263 to 265 may be invalid if the PIB 262 is configured with a second value (0, for example). In one embodiment, the SRAM ID 23 may be configured with an identifier of the static memory i.e., identifier of SRAM unit 130, STRT ADDR 264 may be configured with a starting address or identifier of the memory blocks (e.g., 225-A) from which the critical battery status data may be retrieved, and the END ADDR 264 may be configured with an ending address or identifier of the memory blocks (e.g., 225-Q) until which the critical battery status data is stored. In other embodiment, the display driver 215 may provide the configuration values to the control unit 250, which in turn may configure the first and second configuration registers 251 and 261. In yet other embodiment, the power control unit 150 may configure the configuration registers 251 and 261 in addition to powering on the SRAM unit 130 and the display unit 160.

In one embodiment, the SRAM unit 130 may include one or more memory blocks 225-A to 225-N and a SRAM controller 230. In one embodiment, the SRAM controller 230 may receive the second signal from the power indication logic 210 and in response the SRAM controller 230 may transfer the battery status data to the memory blocks 225-A to 225-N or portions thereof. In one embodiment, the SRAM controller 230 may send a third signal to the control unit 250 to indicate that the battery status data is read for retrieval.

In one embodiment, the display unit 160 may include a display controller 165 and a frame buffer 270. In one embodiment, the display controller 165 may include a control unit 250 and a first and second configuration registers 251. In one embodiment, the control unit 250 may transfer the battery status data from the memory blocks 225 and store the battery status data in the frame buffer 270 in response to receiving a request from the SRAM controller 230 or the display driver 215. In one embodiment, the control unit 250 may receive one or more configuration values from the display driver 215 and in response, the control unit 250 may configure the configuration registers 251 and 261. In one embodiment, the, control unit 250 may render the battery status data, stored in the frame buffer 270, on a display device.

Figure 3:
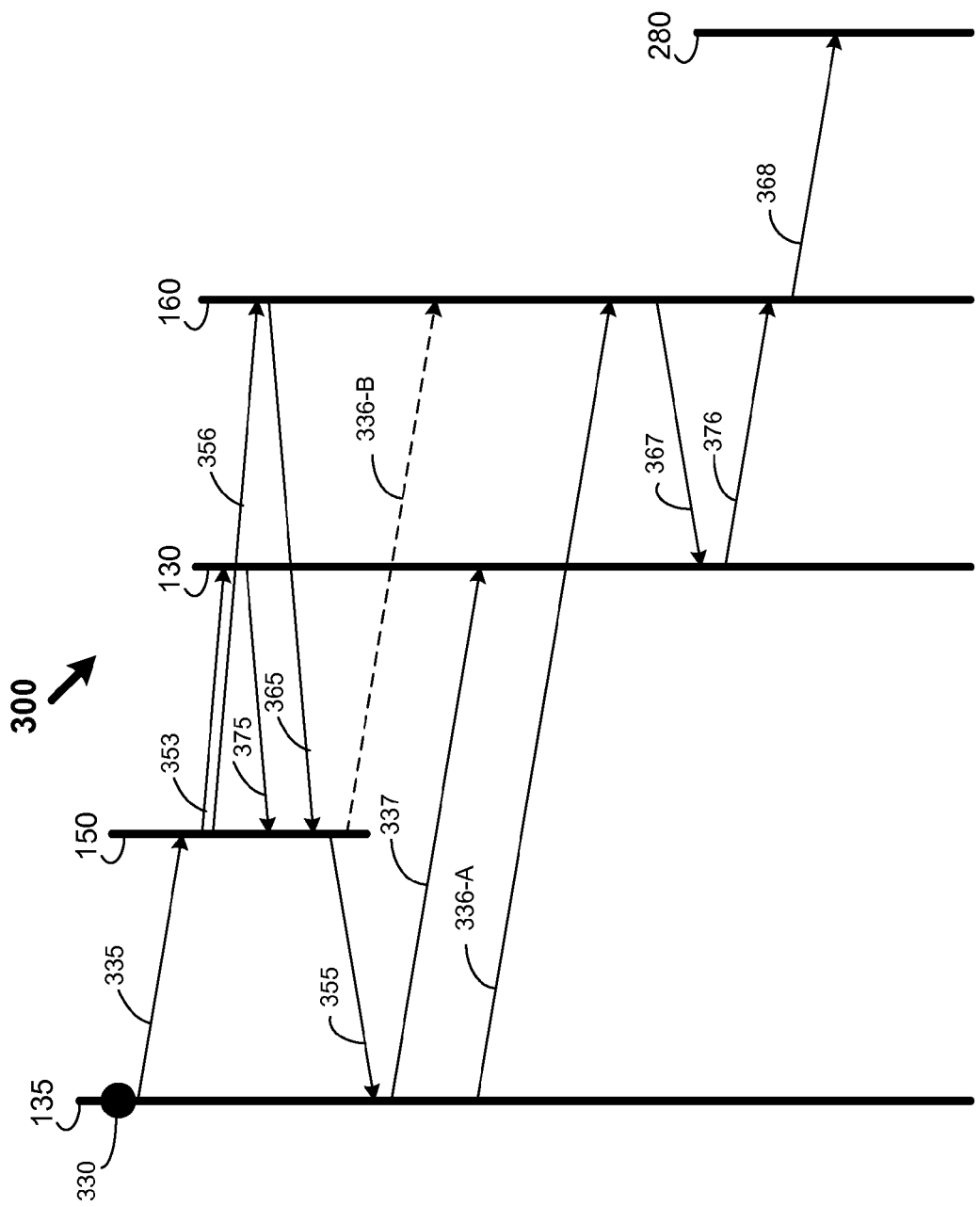
FIG. 3 illustrates the signals exchanged between the blocks of the first portion to support a technique to indicate critical battery status in mobile devices in accordance with one embodiment.

An embodiment of a line diagram 300 illustrating the signals exchanged between the controller 135, PCU 150, SRAM unit 130, and the display unit 170 is illustrated in FIG. 3. In one embodiment, the controller 135 may detect that the charge on the battery has reached or decreased below a critical battery charge level or status and such detection is represented as an event 330. In one embodiment, the power control unit 150 may have powered-down (or any other such low power saving state) the SoC 100 in response to detecting the critical battery charge level or status. In one embodiment, the controller 135 may send a request 335 to the power control unit 150. In one embodiment, the request 335 may indicate a request to power-on only a first portion of the SoC 100 while the second portion (which is substantial) of the SoC 150 may continue to remain in the powered-off state.

In one embodiment, the PCU 150 may power-on the SRAM unit 130 by sending a first power-on signal 357. Similarly, the PCU 150 may power-on the display unit 160 by sending a second power-on signal 356. In one embodiment, the SRAM unit 130 and the display unit 160 may, respectively, send an acknowledgement signal 375 and 365 in response to receiving the power-on signals 357 and 356. In one embodiment, the PCU 150 may send a ready signal 355 to the controller 135. Further, in one embodiment, the PCU 150 may send a configuration signal 336-B (dotted line) to the display unit 160 to configure the configuration registers 251 and 261 provided in the display controller 165.

In one embodiment, the controller 135 (or more specifically power indication logic 210) may store the critical battery status data in the memory blocks 225-A to 225-N and transfer of such critical battery status data from the memory 216 in the controller 135 to the memory blocks 225 is indicated by the data transfer signal 337. In other embodiments, the power indication logic 210 may send a data transfer signal to the SRAM controller 230 and the SRAM controller 230 may retrieve the critical battery status data from the memory 216 and store such data in the memory block 225. In other embodiments, the controller 135 may configure the configuration registers 251 and 261 if the PCU 150 delegates that task to the controller 135 and such configuration activity is illustrated by the configuration signal 336-A.

In one embodiment, the display controller 165 may send a data read signal 367 to the SRAM controller 230 and the SRAM controller 230, in response, may write the critical battery data to the frame buffer 270. Such data transfer activity is represented by a data write signal 376. In other embodiments, the control unit 250 in the display controller 165 may retrieve the critical battery data and store such data in the frame buffer 270. In one embodiment, the control unit 230 may then display or render such critical battery data on the display screen 280 and such an activity is represented by the render signal 368.

An embodiment of an operation of the first portion (depicted in FIG. 2) of the SoC 100 to indicate the critical battery status on a display screen is illustrated in a flow-chart of FIG. 4. In block 410, the controller 135 may check if the charge on the battery 190 has reached a critical battery charge level. In one embodiment, the PCU 150 may generate a status indicator and the controller 135 may use such a status indicator to perform other tasks described below. Control passes to block 420 if the charge on the battery 190 has reached the critical battery charge level and control passes to block 490 otherwise.

In block 420, the controller 135 may identify the first portion (SRAM unit 130 and the display unit 160 and the interfaces 134 and 136, for example) of the SoC 100 to be powered-on. In block 430, the controller 135 may send the identifiers of the blocks, in the first portion of the SoC 100, to the PCU 150 along with a request to power-on such blocks in the first portion of the SoC 100.

In block 435, the controller 135 may check if the blocks in the first portion of the SoC 100 are powered-on and control passes to block 440 if the blocks in the first portion are powered-on. In block 440, the controller 135 may store the critical battery data in a static memory such as the memory blocks 225 of the SRAM unit 130. In block 450, the controller 135 may configure the configuration registers such as the registers 251 and 261 with the configuration values as described above.

In block 460, the display controller 165 may retrieve the critical battery data from the SRAM unit 130 and store such data in the frame buffer 270. In block 470, the display controller 165 may render the critical battery data on a display screen based on the critical battery data retrieved from the static memory. In one embodiment, the visual symbol may indicate the battery charging status. In one embodiment, the visual symbol may be a battery symbol 550 as displayed on the screen of a mobile device 500 depicted in FIG. 5.

In block 475, the controller 135 may check if the charge on the battery has exceeded a critical battery charge level and control passes to block 480 if the charge on the battery exceeds the critical battery charge level and to block 460 otherwise. In block 480, the power control unit 150 may determine if a normal boot sequence may be resumed and control passes to block 490 if the normal boot sequence is to be resumed and to block 460 otherwise.

Figure 6:
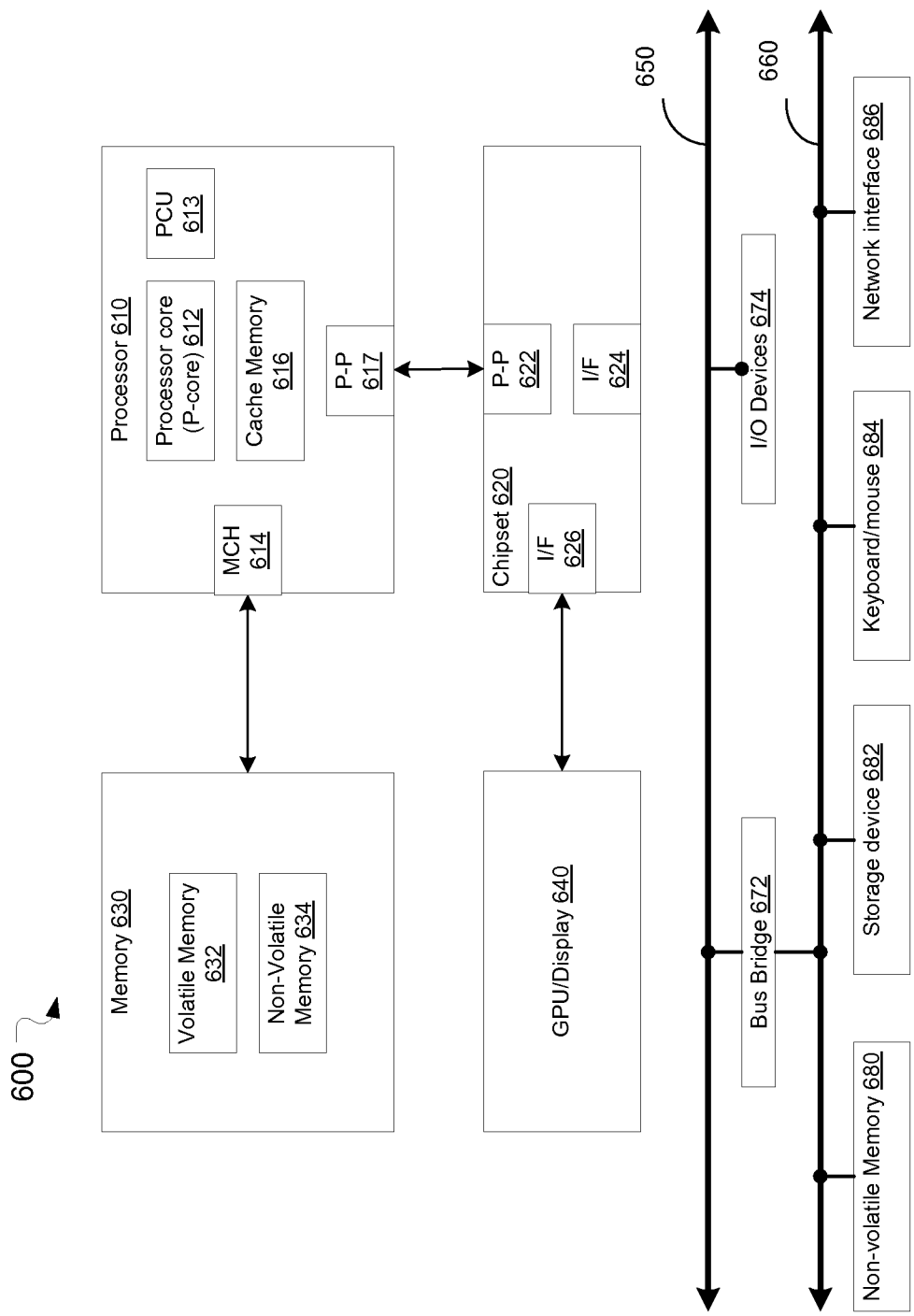
FIG. 6 is a computer system, which may support a technique to indicate critical battery status in mobile devices in accordance with one embodiment.

FIG. 6 illustrates a system or platform 600 to implement the methods disclosed herein in accordance with an embodiment of the invention. The system 600 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 600 used to implement the methods disclosed herein may be a system on a chip (SOC) system.

The processor 610 has a processing core 512 to execute instructions of the system 600. The processing core 612 includes, but is not limited to, fetch logic to fetch instructions, decode logic to decode the instructions, execution logic to execute instructions and the like. The processor 610 has a cache memory 516 to cache instructions and/or data of the system 600. In another embodiment of the invention, the cache memory 616 includes, but is not limited to, level one, level two and level three, cache memory or any other configuration of the cache memory within the processor 610. In one embodiment of the invention, the processor 610 has a central power control unit PCU 613.

The memory control hub (MCH) 614 performs functions that enable the processor 610 to access and communicate with a memory 630 that includes a volatile memory 632 and/or a non-volatile memory 634. The volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 634 includes, but is not limited to, NAND flash memory, phase change memory (PCM), read only memory (ROM), electrically erasable programmable read only memory (EEPROM), or any other type of non-volatile memory device.

The memory 630 stores information and instructions to be executed by the processor 610. The memory 630 may also store temporary variables or other intermediate information while the processor 610 is executing instructions. The chipset 620 connects with the processor 510 via Point-to-Point (PtP) interfaces 617 and 622. The chipset 620 enables the processor 610 to connect to other modules in the system 600. In another embodiment of the invention, the chipset 620 is a platform controller hub (PCH). In one embodiment of the invention, the interfaces 617 and 622 operate in accordance with a PtP communication protocol such as the Intel® QuickPath Interconnect (QPI) or the like. The chipset 620 connects to a GPU or a display device 640 that includes, but is not limited to, liquid crystal display (LCD), cathode ray tube (CRT) display, or any other form of visual display device. In another embodiment of the invention, the GPU 640 is not connected to the chipset 620 and is part of the processor 610 (not shown).

In addition, the chipset 620 connects to one or more buses 650 and 660 that interconnect the various modules 674, 680, 682, 684, and 686. Buses 650 and 660 may be interconnected together via a bus bridge 672 if there is a mismatch in bus speed or communication protocol. The chipset 620 couples with, but is not limited to, a non-volatile memory 680, a mass storage device(s) 682, a keyboard/mouse 684 and a network interface 686. The mass storage device 682 includes, but is not limited to, a solid state drive, a hard disk drive, an universal serial bus flash memory drive, or any other form of computer data storage medium. The network interface 686 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. The system 600 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc., is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An integrated circuit, comprising:
   a power control unit to generate a status indicator if the charge on a battery decreases to a critical battery charge level,
   a controller to include,
   a power indication logic to, detect the occurrence of the status indicator, generate a request to power-on a first portion of the integrated circuit, wherein the request includes an identifier of the blocks in the first portion, send a request to power-on the first portion in response to detecting the status indicator, cause the critical battery status data stored in a memory to be transferred to a static memory, and
   wherein the controller is a processor configured to execute code that causes:
      a display driver to write configuration values into one or more configuration registers in response to receiving a signal from the power indication logic;
   a display controller to,
      determine that the critical battery status data is to be retrieved from the static memory based on the configuration values,
      retrieve the critical battery status data from the static memory, and
      render the critical battery status data in a visual form on a display,
   wherein the first portion to include the static memory and the display controller.

2. The integrated circuit of claim 1, the static memory further comprises a control unit and one or more memory blocks, wherein the critical battery status data is stored in the one or more memory blocks.

3. The integrated circuit of claim 1, the one or more configuration registers include a first register, wherein the first register includes a power indication bit (PIB), static random access memory identifier (SRAM ID) field, start address (STRT ADDR) field, and an end address (END ADDR) field, wherein the PIB is configured with a first value, SRAM ID field is configured with an identifier of the static memory, STRT ADDR is configured with a starting address of the memory blocks from which the critical battery status data is to be retrieved, and the END ADDR field is configured with a last address of the memory blocks storing the critical battery status data.

4. The integrated circuit of claim 3, wherein storing the first value in the PIB is to indicate that the configuration values stored in the SRAM ID field, STRT ADDR field, and END ADDR field are valid.

5. The integrated circuit of claim 3, wherein storing a second value in the PIB is to indicate that one or more values stored in the SRAM ID field, STRT ADDR field, and END ADDR field are invalid.

6. The integrated circuit of claim 5, wherein the display controller to store the critical battery status data in a frame buffer after retrieving the critical battery status data from the memory blocks of the static memory before displaying the visual form on the display screen.

7. The integrated circuit of claim 6 the display controller further comprises a control unit, wherein the control unit to render the critical battery status data, in a visual form, on a display.

8. A method in an integrated circuit, comprising:
generating a status indicator in response to detecting a critical battery charge level is reached,
sending identifiers of one or more blocks to be powered-on in response to occurrence of the status indicator,
powering-on the one or more blocks based on the identifiers of the one or more blocks, wherein the one or more blocks include a static memory block and a display unit,
storing critical battery status data in the static memory block, wherein the static memory block is one of the one or more blocks which is powered-on,
configuring a first register to cause the critical battery status data to be retrieved from the static memory block, wherein configuring the first register further includes, configuring a power indication bit of the first register with a first value to indicate that configuration values in other fields of the first register are valid, configuring a static memory identifier field with an identifier of the static memory in which the critical battery status data is stored, wherein the other fields include the static memory field, configuring a start address and an end address field, respectively, with a starting address and a last address of memory blocks in which the critical battery status is stored,
configuring a power indication bit of a second register with a second value to indicate that configuration values in other fields of the second register are invalid, wherein the other fields include a field to store an identifier of a dynamic memory,
retrieving the critical battery status data based on the starting and last address and storing the critical battery status data into a frame buffer,
displaying a battery status in a visual form to indicate that a battery is being charged while substantial portion including a host processor is powered-down.

9. The method of claim 8 comprises displaying a battery symbol on the display screen to indicate to a user that the battery is charging.

10. The method of claim 8 further comprises checking a charge level on the battery at regular intervals and powering-on the substantial portion in response to receiving an input from the user.

11. The method of claim 10 comprises powering-on at least the host processor, a dynamic memory block, and a system agent in response to receiving the input from the user.

* * * * *